United States Patent [19]

Kress et al.

[11] Patent Number: 4,971,483
[45] Date of Patent: Nov. 20, 1990

[54] CUTTER PLATE FOR PRECISION WORKING, ESPECIALLY OF HOLES

[75] Inventors: Dieter Kress, Aalen; Friedrich Häberle, Lauchheim, both of Fed. Rep. of Germany

[73] Assignee: Mapal Fabrik fur Prazisionswerkzeuge Dr. Kress KG, Aalen, Fed. Rep. of Germany

[21] Appl. No.: 397,505

[22] Filed: Aug. 23, 1989

[30] Foreign Application Priority Data

Sep. 24, 1988 [DE] Fed. Rep. of Germany ....... 3832547

[51] Int. Cl.$^5$ .......................... B23P 15/28; B26D 1/00
[52] U.S. Cl. .................................... 407/114; 407/113; 407/115; 407/116
[58] Field of Search ................. 407/113, 114, 115, 116

[56] References Cited

U.S. PATENT DOCUMENTS

| 3,137,917 | 6/1964 | Dowd | 407/114 |
| 4,047,826 | 9/1977 | Bennett | 407/113 |
| 4,059,363 | 11/1977 | Romagnolo | 407/114 |
| 4,449,864 | 5/1984 | Haque et al. | 407/113 |
| 4,636,116 | 1/1987 | Shikata | 407/114 |

Primary Examiner—William E. Terrell
Assistant Examiner—Mark F. Frazier
Attorney, Agent, or Firm—Staas & Halsey

[57] ABSTRACT

A cutter plate is provided for precision working, especially of holes, which is constructed as a symmetrical polygon with at least four corners and has at least one main cutting edge and one auxiliary cutting edge, as well as a projection which begins at the chip run-off surface of the cutting edges, whose sides serve as chip-guiding steps and whose boundary lines circumscribe a symmetrical polygon, whose shape corresponds to that of the cutter plate, and has smaller dimensions than the latter, so that, starting from the corner regions of the polygon, the width of the chip run-off surfaces decreases. The cutter plate is distinguished by the fact that each chip run-off surface has a plane shape and is inclined in the direction of its longitudinal extension by an angle in such a way that the narrowest region is at the greatest height and is arranged to be above the neighboring chip run-off surface, so that it can be manufactured very simply and economically by a grinding procedure. In this way, a very high accuracy of dimensions can be achieved. With this cutter plate, an optimum flow of chips and hence a superior surface quality, can be achieved. The shape of the cutter plate is so simple that several different cutter plates can be manufactured easily at favorable cost for various application purposes.

15 Claims, 3 Drawing Sheets

CUTTER PLATE FOR PRECISION WORKING, ESPECIALLY OF HOLES

BACKGROUND OF THE INVENTION

The invention relates to a cutter plate for precision working, especially of holes, which is constructed as a symmetrical polygon with at least four corners and has at least one main cutting edge and one auxiliary cutting edge, as well as a projection which begins at chip run-off surfaces of the cutting edges, whose sides serve as chip-guiding steps. In addition, the invention relates to a process for the manufacture of such a cutter plate.

The precision working of workpieces, especially of the walls of holes, by chip-removal processes, is becoming more and more important, because in this way a subsequent working by honing and/or by other supplemental processes can be eliminated. It is especially important in the precision or fine working of workpieces to have the correct flow of chips and the chip breakage which occurs as a result. Only in this way can it be assured, in the precision working of holes, that there is no formation of chips of excessive length, which would lead to an accumulation of chips, which in turn would impair the quality of the surface being processed. An important drawback of known cutter plates is also that their manufacture is very costly.

A cutter plate of the kind mentioned at the outset is already known from FIG. 15 of German Preliminary Pat. No. DE-OS 26 15 589. There a total of four cutting corners or angles is provided, where a chip surface is associated with each cutting corner and is made up of two mutually intersecting surface elements, which come together in the curvature-bisecting plane of the cutting corner at an arc of curvature. This is seen particularly in FIG. 26. The production of a cutter plate shaped in this way is extremely complicated, as well as time-consuming, and is therefore costly. In particular, only special working tools can be used, which must be changed repeatedly during the manufacturing operation. Furthermore, it is necessary to use repeated re-chucking operations on the cutter plate being manufactured. It is also possible to manufacture the cutter plate by a sintering procedure, but the edge radii which are produced in this way are unsuitable for precision or fine working.

SUMMARY OF THE INVENTION

It is therefore the object of the invention to provide a cutter plate which can be manufactured simply and thus economically, for the precision working of surfaces, espcially of holes, with which optimum surface qualities can be achieved, so that subsequent working steps can be dispensed with.

This object is accomplished, in a cutter plate of the kind mentioned at the outset, with the aid of the characteristics stated in claim 1. In this cutter plate, a chip run-off surface lying between a cutting edge and a chip-guiding step is inclined, in the direction of its longitudinal extension, by an angle $\beta$. A changing height of the chip-guiding step results in an especially good flow of chips, the chips which run onto it are also broken optimally. As a result, a blockage with chips due to excessively long, or crushed, chips is safely avoided, so that damage to the surface being prepared, owing to an accumulation of chips, is practically excluded. The cutter plate can be manufactured simply and economically by grinding. The inclination of the chip run-off surfaces prevents the cutting edges from being damaged during the grinding of the chip run-off surfaces. The shape of the cutter plate is so simple that several different cutter plates can easily be made, at favorable cost, for different application purposes.

A preferred embodiment of the invention is distinguished by a fact that both the cutter plate and the projection which is provided on the cutter plate, whose sides serve as chip-guiding steps, have the shape of a symmetrical, regular hexagon. Such a cutter plate can be especially securely fastened in a clamping shoe which serves to hold the cutter plate, the said clamping shoe preferably having the form of a swiveling cassette. In particular, the symmetrical hexagonal shape of the cutter plate guarantees a stable seating in the clamping shoe.

An embodiment is preferred in which all external edges of the cutter plate are constructed as cutting edges, so that the cutter plate can be used as a turnplate. Depending on the fastening of the cutter plate in an appropriate tool, all external edges serve as both the main cutter and as auxiliary cutters. This leads to an especially good utilization of the cutter plate, i.e. to very good economy.

A further preferred embodiment is distinguished by the fact that the chip run-off surface of the cutting edge falls off to the chip-guiding step at an angle $\tau$. The run-off and breakage behavior of the chips is favorably affected in this way.

Furthermore, it is an object of the invention to provide a process by which a cutter plate of the kind stated at the outset can be manufactured in a simple and economical manner.

This object is achieved by a process for the preparation of a cutter plate for the precision working of surfaces, especially of holes, which is constructed as a symmetrical polygon with at least four corners and has at least one main cutting edge and one auxiliary cutting edge, as well as a projection which begins at the chip run-off surfaces of the cutting edges, whose sides serve as chip-guiding steps and whose outer boundary lines circumscribe a symmetrical polygon, whose shape corresponds to that of the cutter plate, where the projection is rotated by an angle $\alpha$ relative to the main body of the cutter plate, and has smaller dimensions than the latter, so that, starting from the corner regions of the polygon, the width of the chip run-off surfaces decreases, the process being distinguished by the fact that the chip run-off surfaces are made by a grinding process, whereby a grinding disk is moved in a straight line along the cutter plate in such a way that portions of the projection are removed. It is especially advantageous that a relatively large and hence insensitive grinding disk can be used in the manufacture of the cutter plate. The linear movement of the grinding disk relative to the cutter plate is also very simple, i.e. the course of the movement is easily reproducible. As a result, the cutter plate can also be manufactured by an automatic process.

Further advantages and elaborations of the cutter plate can be found in the subordinate claims.

Brief Description of the Drawings

The invention will be further elucidated using the drawing which shows one example of an embodiment. Here

Description of the Preferred Embodiments

Figure 1:
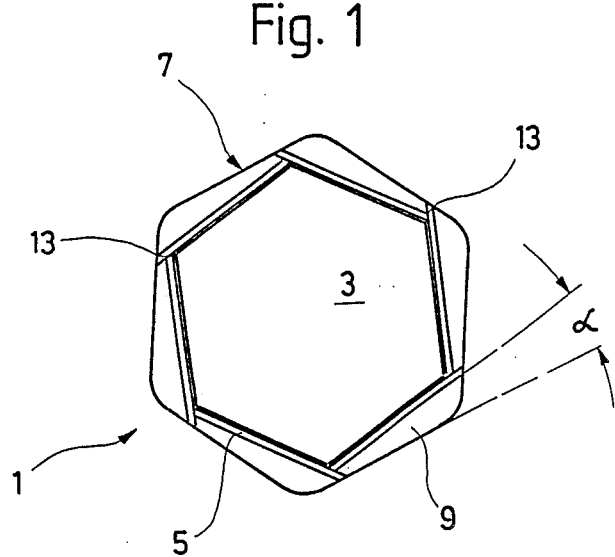
FIG. 1 shows a plan view of the front side of a cutter plate.

In FIG. 1, a cutter plate 1 is represented by way of example as a regular hexagon. Basically, however, the other cutter plates are also suitable, e.g. four-, five or eight-cornered ones.

Figure 5:
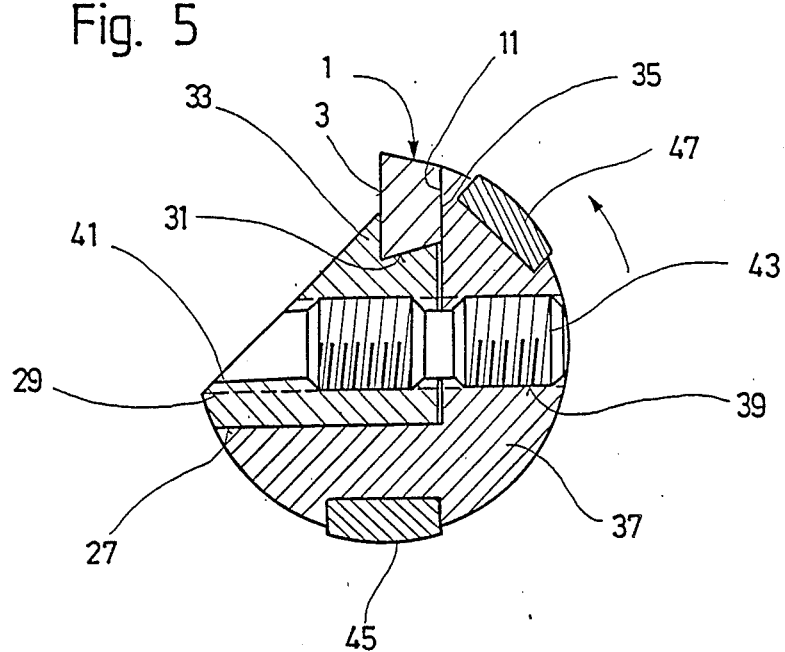
FIG. 5 shows as section through a tool which holds the cutter plate.

A projection or elevation 3 is provided on the front side of cutter plate 1; this projection serves as a cutting face, and thus as the surface which faces a clamping shoe which in turn serves to fasten the cutter plate in a tool (cf. FIG. 5).

Projection 3 likewise has the shape of a regular, symmetrical hexagon. The sides 1 the projection 3, which serve as chip-guiding steps 5, here indeed do not run parallel to the side edges 7 of the cutter plate. Here the projection 3 is rotated by an angle $\alpha$ relative to the main body of the cutter plate. The angle $\alpha$ can lie within the range $0° \leq \alpha \leq 20°$. However, it has been found especially favorable if $\alpha$ has a value of 10°.

It can be seen from the representation in FIG. 1 that the outside dimensions of projection 3 are smaller than the outside dimensions of cutter plate 1. The end points or corners (see corner 23 in FIG. 3) of projection 3 therefore lie at a distance from the side edges 7 of cutter plate 1. It has been found especially advantageous if projection 3 is 5% to 25% smaller, preferably 10% to 15% smaller, than the cutter plate.

Side edges 7 of cutter plate 1 form the cutting edges of the cutter plate. It can be seen clearly that the side edges do not meet each other at an angle and form an edge, but rather that a radius is provided in the transition regions.

FIG. 1 shows that chip run-off surfaces 9 exist between side edges 7 and chip-guiding steps 5. It can be seen from FIG. 2 that the chip run-off surfaces do not run parallel to the surface of projection 3 or to the back side 11 of cutter plate 1. They are inclined, when viewed in the direction of their longitudinal extension, by an angle $\beta$ which lies in the range $0° \leq \beta \leq 5°$, and preferably takes on the value of 1.5°. Angle $\beta$ is also denoted as the deformation angle or correction angle.

In the example of an embodiment which is represented in the Figure, the chip run-off surface widens, in each case, in a counterclockwise direction. The narrowest region of the chip run-off surfaces is the highest one. The chip run-off surface thus falls off in the counterclockwise direction. Because the widest portion of a chip run-off surface is its deepest region, a small step 13 is produced relative to the chip run-off surface which adjoins in a counterclockwise direction.

A double line in FIG. 11 indicates that here a radius is ground in at the transition between chip run-off surface 9 and step 5 or step 13.

Chip run-off surfaces 9 not only are inclined in their longitudinal direction by an angle $\beta$ and fall off in the counterclockwise direction, but there is also a slope transverse to the longitudinal extension, i.e. from side edges 7 to the sides of projection 3 which serve as chip-guiding steps 5. The slope exhibits an angle $\tau$ of $0° \leq \tau \leq 15°$. Preferably an angle of 3° to 6° is chosen. Angle $\tau$ is also denoted as the chip angle.

Figure 2:
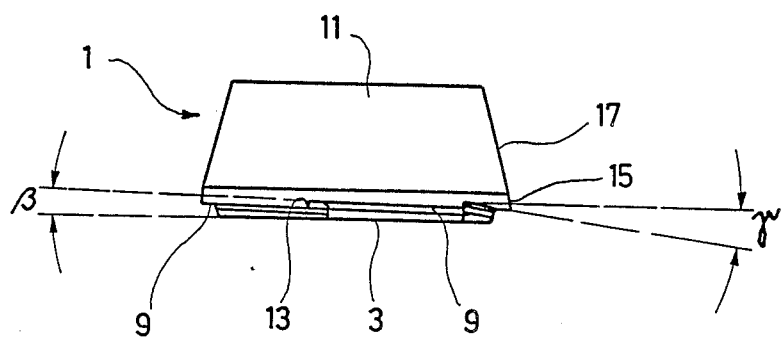
FIG. 2 shows a side view of a cutter plate in accordance with FIG. 1.

It can be seen from the side view of FIG. 2 that the side wall of the cutter plate falls off starting from side edge 7. Here an angle of 7° is chosen. This region forms the free surface 15 of the side edges of cutter plate 1; these side edges serve as cutting edges. A region 17 adjoins free surface 15; this region is inclined by 15°, for example, relative to the horizontal. Region 17 is thus inclined more sharply than is free surface 15.

Figure 3:
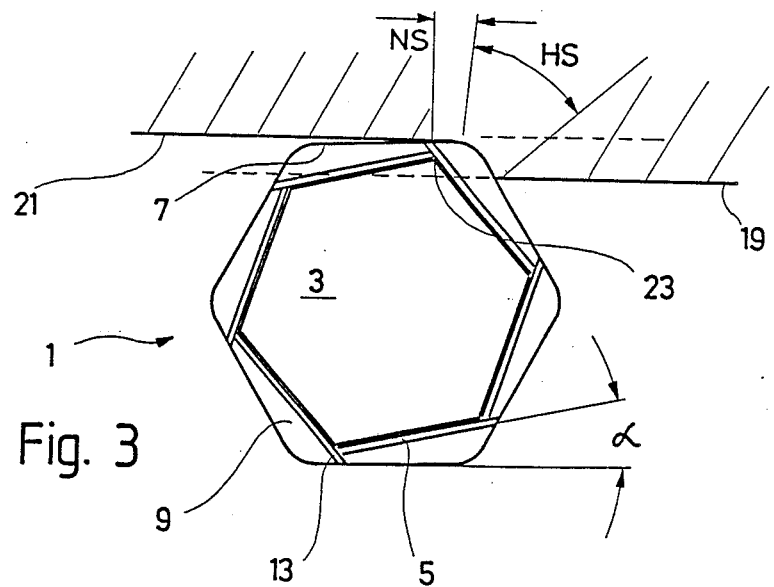
FIG. 3 shows a cutter plate in contact with a surface which is to be worked.

FIG. 3 shows a cutter plate in accordance with FIG. 1, in contact with a surface, for example with the wall of a hole 19. The same parts are provided with the same reference symbols, so that there is no need to describe them here.

In the working of the hole wall 19 with the aid of cutter plate 1, the latter is clamped firmly, in a suitable manner, in a tool not represented here. The tool moves parallel to the surface of the hole wall 19, in FIG. 3 from left to right. As this occurs, cutter plate is set in rotation along with the tool, so that in FIG. 3 it moves toward the observer, i.e. out of the plane of the Figure.

In FIG. 3, the material of the hole wall 19 which is removed by cutter plate 1, the depth of cut, is represented by dashed lines. The region of the side edge 7 of cutter plate 1 which falls off in the forward direction, or is inclined, serves as the principal cutter HS in the working of the surface or the hole wall 19. The adjoining region of side edge 7 in the counterclockwise direction, i.e. the one to the left in FIG. 3, serves as the auxiliary cutter NS. Side edge 7 of cutter plate 1 is inclined here in such a way that it runs practically parallel to the hole wall which is to be worked. The amount of inclination is represented here in an exaggerated manner. The auxiliary cutter falls off by 50 to 100 $\mu$m based on its total length. This inclination assures that step 13 does not come into contact with the surface 21 which is to be worked, as this would impair its surface quality.

It can be seen from FIG. 3 that the width of chip run-off surface 9 in the region of the principal cutter HS and auxiliary cutter NS can be varied by a change in angle $\alpha$. The width of chip run-off surface 9 can be adjusted during the manufacture of a cutter plate, depending on the material of the surface to be worked. In doing this, care should be taken that the width is not chosen to be too small, in order to avoid chip accumulation. If, on the other hand, the width is adjusted to be too large, the chip will no longer break off, so that long continuous chips or spirals are produced. A blockage of chips can occur both by chip accumulation and by chips which are too long. In this way, chips could damage the surface 21 of the hole wall 19 which is being worked.

The outside dimensions of projection 3 must be chosen such that the corner 23 of projection 3 in the region of the main cutter HS or the auxiliary cutter NS which works the hole wall 19 preferably lies in the region of the depth of cut represented by dashed lines. This results in an optimum chip run-off behavior.

If, as represented here, chip run-off surface 9 is made to be planar, the chip run-off behavior depends exclusively on the distance of side edge 7 to the side of projection 3 which serves as the chip-guiding step. In this way, the chip run-off behavior can be predicted in an especially simple manner.

It is immediately evident from FIG. 3 that cutter plate 1 need only be rotated by 60° if the principal or auxiliary cutter in contact with hole wall 19 has been worn down. Owing to the fact that the geometry is the same at all edges of the cutter plate, there is an optimum utilization of the cutting edges.

Figure 4:
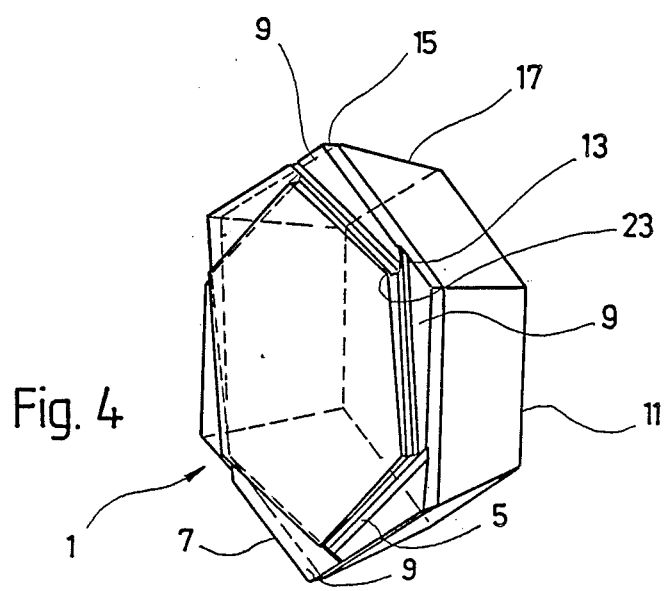
FIG. 4 shows a perspective representation of a cutter plate.

In FIG. 4, a perspective view of the cutter plate of FIGS. 1 to 3 is shown from an oblique forward position.

The geometric relationships of the chip-guiding steps 5 and the chip run-off surfaces 9 can be seen especially well from this representation.

Before the preparation of the chip run-off surfaces, projection 3 extends over the entire surface of cutter plate 1. Chip run-off surfaces 9 are removed by means of a grinding disk. Since the chip-grinding steps run in a straight line, the grinding disk is also moved in a straight line along the cutter plate. It can be seen from this, that the manufacture of the cutter plate is relatively simple and can also be effected by an automatic process. Owing to the simple geometry, it is possible to work away the chip run-off surfaces 9 with relatively large grinding disks, which are relatively insensitive.

The manufacture of the cutter plate with the help of the grinding process is very simple and hence economical. Furthermore, the advantage of this manufacturing process is that very small radii of the cutting edges, e.g. in the range of 5 μm, can be made.

It can be seen from FIG. 4 that the chip run-off surfaces 9 are inclined slightly in their longitudinal direction. As a result, the step 13 is formed at the side edges 7, in the region of transition from one chip run-off surface into the next. Using FIG. 3, it is illustrated that, during the working of a surface, for example of a hole wall 19, the side edge 7 of a cutter plate 1 is inclined in such a way that step 13 does not touch the surface 21 which is being worked.

The transition regions (which exhibit a radius) between the chip run-off surfaces 9 and the chip-guiding steps 5 of projection 3 are emphasized with double lines. Chip run-off surface 9 encloses an angle with chip-guiding step 5 which is preferably about 90°.

The attachment of a cutter plate in accordance with FIGS. 1 to 4 is further elucidated using FIG. 5. The latter represents a cross section through a tool in which cutter plate 1 is firmly clamped. The tool has a body 37 with an essentially circular cross section. A recess 27 is provided in the body, and a clamping shoe 29 is inserted into this recess. The clamping shoe, in turn, is provided with a recess 31, whose contours are adapted to the outside shape of cutter plate 1. This is represented with the aid of FIG. 6. Cutter plate 1 is inserted into recess 31, and a projection or the clamping lip 33 of clamping shoe 29 presses against the surface of projection 3, which serves as the face of the cutter. At the same time, the back side 11 of the cutter plate is pressed against a shoulder 35 of tool body 37.

Tool body 37 is provided with a hole 39, which has an internal thread. A hole 41 in clamping shoe 29 aligns with this hole, and hole 41 is provided with an internal thread. A clamping screw 43 is inserted into holes 39 and 41, by means of which clamping shoe 29 is clamped together with the cutter head in a known manner, so that in this way cutter plate 1 is firmly clamped in recess 31.

It can also be seen from the cross section sketched in FIG. 5 that a first guide strip 45 is provided at the periphery of the tool opposite cutter plate 1. A second guide strip 47 is arranged somewhat beyond the cutter plate, as viewed in the direction of rotation. The guide strips are inserted into corresponding grooves in cutter body 37.

In the representation chosen here, cutter plate 1 lies, for example, in a plane which intersects the longitudinal axis of the tool. However, it can also be clamped in the tool in a swiveled manner, such that it lies with only its active cutting edge in a plane which intersects the longitudinal or central axis of the tool.

Since cutter plate 1 is constructed as a turnplate, recess 31 in clamping shoe 29 must be formed in such a way that the cutters which lie next to the clamping shoe or the walls of recess 31 are not damaged.

In the working of a surface or hole wall in accordance with FIG. 3, the tool turns in the direction of the indicated arrow, i.e. in the counterclockwise direction in the view in FIG. 5. In so doing, the tool moves out of the plane of the drawing and toward the observer.

Figure 6:
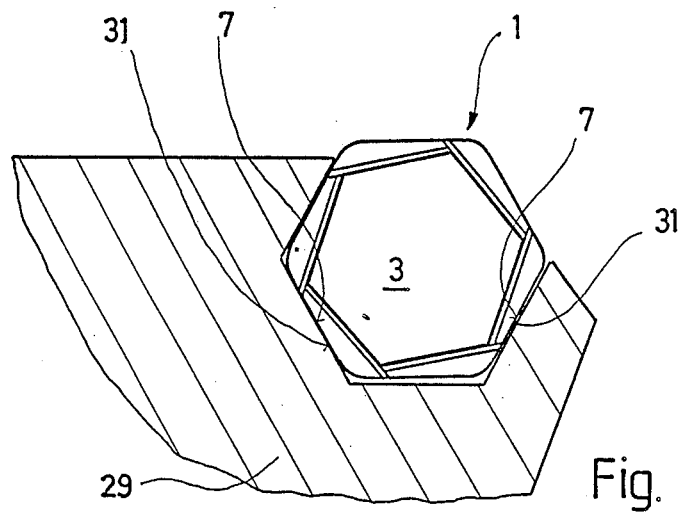
FIG. 6 shows a cutaway of a tool with an inserted cutter plate.

FIG. 6 represents a plan view of a cutter plate inserted in a clamping shoe. For better understanding, clamping lip 33 is omitted here. The shape of recess 31 in clamping shoe 29 is adapted to the external shape of cutter plate 1. The recess also has two side walls which open conically toward the interior in the direction of the bottom of recess 31 in clamping shoe 29. The bottom runs essentially parallel to the outside surface of the tool. The dimensions of the recess are chosen such that two side edges 7 of cutter plate 1 lie firmly against the conically running side walls of recess 31. To compensate for tolerances in measurements, the cutter plate does not rest on the bottom of recess 31, but rather only on the side walls which adjoin the bottom and run diagonally relative to the latter. In this way, cutter plate 1 is firmly held in the clamping shoe 29 of the tool.

SUMMARY

A cutter plate is provided for precision working, especially of holes, which is constructed as a symmetrical polygon with at least four corners and has at least one main cutting edge and one auxiliary cutting edge, as well as a projection which begins at the chip run-off surfaces of the cutting edges, whose side serve as chip-guiding steps and whose outer boundary lines circumscribe a symmetrical polygon, whose shape corresponds to that of the cutter plate, where the projection is rotated by an angle $\alpha$ relative to the latter, and has smaller dimensions than the latter, so that, starting from the corner regions of the polygon, the width of the chip run-off surfaces decreases. The cutter plate is distinguished by the fact that each chip run-off surface (9) has a plane shape and is inclined in the direction of its longitudinal extension by an angle ($\beta$) in such a way that the narrowest region is at the greatest height and is arranged to be above the neighboring chip run-off surface (9), so that it can be manufactured very simply and economically by a grinding procedure. In this way, a very high accuracy of dimensions can be achieved. With this cutter plate, an optimum flow of chips and hence a superior surface quality, can be achieved. The shape of the cutter plate is so simple that several different cutter plates can be manufactured easily at favorable cost for various application purposes.

We claim:

1. A cutter plate for precision machining, particularly of boreholes, including—a symmetrical polygon body having a front, sides, and at least four corners, at least one primary cutting edge formed where the front, a side and a corner intersect, at least one secondary cutting edge where the front and a side intersect and adjacent to the primary cutting edge in a counterclockwise direction; an elevated area in a shape of a symmetrical polygon corresponding to the shape of the cutter plate, extending from the front of the cutter plate and having a planar front; chip guide steps formed where the elevated area intersects with the front of the symmetrical polygon body; and elongated chip run off surfaces formed between the chip guide steps and the sides of the symmetrical polygon body, wherein the elevated area is rotated by an angle ($\alpha$) with respect to the cutter plate, and has outer dimensions smaller than outer dimensions of the cutter plate so that, extending from the corners of the symmetrical polygon body in a counterclockwise direction, a width of each chip run off surface narrows, the improvement comprising:

each chip guide step being rectilinear, each chip run off surface being a continuous plane inclined at an angle ($\beta$) in the direction of its length relative to the planar front of the elevated area, such that the narrowest width thereof is positioned farthest from the front of the elevated area, above a widest portion of an adjacent chip run off surface, so that a step extends between the widest portion of one chip run off surface and the narrowest portion of an adjacent chip run off surface.

2. The cutter plate as recited in claim 1, wherein each of the cutter plate and the elevated area has the shape of a regular hexagon.

3. The cutter plate as recited in claim 2, wherein the at least one primary cutting edge and at least one secondary cutting edge merge via a radius.

4. The cutter plate as recited in claim 2, wherein the cutter plate is used as a turnplate, where the number of corners of the cutter plate corresponds to the number of the at least one primary cutting edge and the at least one secondary cutting edge, respectively.

5. The cutter plate as recited in claim 3, wherein the chip run-off surfaces are inclined transversely to their length by an angle ($\tau$).

6. The cutter plate as recited in claim 1, wherein the cutter plate is used as a turnplate, where the number of corners of the cutter plate corresponds to the number of the at least one primary cutting edge and the at least one secondary cutting edge, respectively.

7. The cutter plate as recited in claim 6, wherein the chip run-off surfaces are inclined transverely to their length by an angle ($\tau$).

8. The cutter plate as recited in claim 1, wherein the chip run-off surfaces are inclined transversely to their length by an angle ($\tau$).

9. The cutter plate as recited in claim 8, wherein $0° \leq \tau \leq 15°$.

10. The cutter plate as recited in claim 1, wherein $0° \leq \alpha \leq 20°$.

11. The cutter plate as recited in claim 1, wherein $0 \leq \beta \leq 5°$.

12. The cutter plate as recited in claim 1, wherein the at least one primary cutting edge and the at least one secondary cutting edge merge via a radius.

13. The cutter plate as recited in claim 12, wherein a radius is provided at a transition between each chip run-off surface and each chip-guide step.

14. The cutter plate as recited claim 1, wherein a radius is provided at a transition between each chip run-off surface and an adjacent chip-guide step.

15. The cutter plate as recited in claim 1, wherein the outer dimensions of the elevated area are 5% to 25% smaller than the outer dimensions of the cutter plate.

* * * * *